United States Patent [19]

Desir

[11] Patent Number: 4,737,281
[45] Date of Patent: Apr. 12, 1988

[54] COLD TRAP FOR PURIFYING LIQUID SODIUM CONTAINING IMPURITIES

[75] Inventor: Dominique Desir, Jouy-en-Josas, France

[73] Assignee: Service National Electricite de France, France

[21] Appl. No.: 894,398

[22] Filed: Aug. 12, 1986

Related U.S. Application Data

[63] Continuation of Ser. No. 688,514, Jan. 3, 1985, abandoned.

[30] Foreign Application Priority Data

Jan. 5, 1984 [FR] France ................................. 84 00123

[51] Int. Cl.4 ............................................. B01D 23/00
[52] U.S. Cl. ..................................... 210/184; 165/119
[58] Field of Search ....................... 210/184, 175, 181; 165/119

[56] References Cited

U.S. PATENT DOCUMENTS 3,315,737  4/1967  Welch ................................. 165/119
3,552,485  1/1971  Jannou et al. ..................... 165/119

FOREIGN PATENT DOCUMENTS 1549434  12/1968  France.
2395570   1/1979  France.
245009    2/1968  U.S.S.R. ............................. 165/119

OTHER PUBLICATIONS

Patents Abstracts of Japan, vol. 1, No. 97, Aug. 30, 1977, p. 2136C77 & JP-A-52-58007 (Mitsubishi Jukogyo K.K.) 13-05-1977.
Patents Abstracts of Japan, vol. 1, No. 102, Sep. 10, 1977, p. 2265C77 & JP-A-52-63107 (Mitsubishi Jukogyo K.K.) 25-05-1977.

Primary Examiner—Helen M. S. Sneed
Assistant Examiner—Sharon T. Cohen

[57] ABSTRACT

Cold trap for purifying liquid sodium containing impurities of the type comprising, in a sealed enclosure cooled by a cooling fluid flowing in contact with its outer surface, in the upper part an economizer for lowering the temperature of the hot sodium and ensuring its introduction into the trap, and in the lower part the actual trap containing a filter plug, kept at its cold point temperature, wherein the enclosure is annular, the filter plug being located in the space between two concentric cylindrical ferrules.

3 Claims, 3 Drawing Sheets

COLD TRAP FOR PURIFYING LIQUID SODIUM CONTAINING IMPURITIES

This application is a continuation of application Ser. No. 688,514, filed Jan. 3, 1985, now abandoned.

BACKGROUND OF THE INVENTION

The present invention relates to a cold trap for retaining impurities which can be encountered in the liquid sodium of a supply circuit, e.g. of the type found in the nuclear industry.

The impurities found in the liquid sodium of such a circuit can have various origins and can in particular result from the initial sodium charge, contamination by the confinement materials of the vessels containing the same, gases covering said vessels, pollution resulting from the accidental entry of air particularly during maintenance or assembly work on the installation in which the sodium circulates, the products of a possible reaction between the sodium and the water and finally the diffusion of hydrogen or hydrogenated products through the walls of the heat exchangers or steam generators of a heat transfer installation.

All these impurities must be permanently removed as soon as they appear by precipitation - filtration -purification because they have a prejudicial influence on:

the precipitation of the compounds formed with the sodium in the cold branches of the circuits, the embrittlement of steels (C, $N_2$, $H_2$), the acceleration of corrosion ($O_2$, $H_2$, NaOH), the increase in the residual hydrogen concentration disturbing the satisfactory operation of the leak detection of the circuit of the installation by measurement of the hydrogen concentration.

In an exemplified manner, FIG. 1 shows a known cylindrical cold trap for illustrating the construction and operation of such an apparatus.

This known control trap essentially comprises a vertically axed, cylindrical reservoir 1, in which circulates the sodium to be purified and coming from the confinement enclosure (circuit or vessel). In its upper part 2, the cold trap has an economizer 3, constituted by usually helically wound tubes, into which passes the hot liquid sodium to be treated via pipe 4. In said upper part 2, the temperature of the hot sodium (approx. 400° C.) is progressively lowered to approach the cold point temperature (110° to 120° C.) of the installation. The sodium flows from the economizer via a series of jets such as 5 directed towards the low part 6 of the installation. This low part essentially has an annular filter plug 7, generally formed by stainless steel wool, in which the sodium flows from top to bottom in accordance with the arrows F and then rises again, as shown by the arrows F', in the central inner shaft 8 and leaves via pipe 9, after reheating to approximately 360° C.

The low part 6 is cooled and maintained at the cold point temperature with the aid of a cooling flow diagrammatically indicated by arrows F'' in FIG. 1, which indicate that a cooling liquid or gas flows outside reservoir 1 and on low part 6 thereof in order to reduce its temperature. This fluid arrives at a temperature of 20° C. and is then heated to e.g. approximately 80° C. The sodium circulating between the filter plug 7 is also maintained at the cold point temperature of the trap and deposits its impurities, which are both condensed and filtered during passage through the filter plug 7.

The treated and purified sodium, which rises through the inner shaft 8 then flows towards the outside through pipe 9, after passing through the high part 2 of the trap in the opposite direction.

Thus, in the trap of FIG. 1, all the sodium flow from the cold trap passes through the cold point before rising through the inner shaft 8 up to the high part of the trap, where it is reheated in economizer 3 to a temperature close to its entry temperature. Thus, this economizer 3 functions as a heat exchanger between the hot sodium entering via pipe 4 and the cold sodium leaving via pipe 9.

In a cold trap of the type described relative to FIG. 1, the lower part is generally cooled by a liquid or gaseous fluid, e.g. an organic liquid or air circulated by a not shown pump and the heat flow to be removed then passes through the outer envelope or wall of reservoir 1.

Although this construction functions completely satisfactorily, it only permits a relatively limited cooling of the filter plug 7, because the heat to be removed must pass through the outer envelope, which has a relatively reduced surface area. When it is wished to obtain a high cooling flow, for a large sodium flow rate (large capacity trap), the cooling medium is generally constituted by an organic liquid, whose calorific capacity is higher than that of a gas. However, as stated hereinbefore, this means that it is necessary to have a circuit for the organic liquid and which comprises a heat exchanger and pump, which makes the operation of the trap much more difficult.

When using a small capacity trap, it is merely necessary to cool its lower part with air, but then the heat flow which can be removed is limited by the small exchange coefficient between the air and the trap wall. The heat exchange flow can be increased to a limited extent by increasing the exchange surface, which is then lined with transverse or longitudinal blades and/or barbs and wires welded to the outer ferrule.

However, cylindrical traps of the type shown in FIG. 1 have a treatment capacity which is relatively limited as a result of the small exchange surface.

SUMMARY OF THE INVENTION

The present invention relates to a cold trap for purifying liquid sodium containing impurities, whose exchange surface is significantly increased by a special geometrical arrangement of the lower part of the trap.

The invention therefore specifically relates to a cold trap for purifying liquid sodium containing impurities of the type comprising in a sealed enclosure cooled by a cooling fluid flowing in contact with its outer surface, in the upper part an economizer for lowering the hot sodium temperature and ensuring its introduction into the trap, and in the lower part the actual trap containing a filter plug, maintained at the cold point temperature and through which the sodium flows whilst giving up its impurities, in accordance with a double hairpin path involving a downward travel through the filter plug material and an upward travel in a shaft within said material, wherein the enclosure is annular, the filter plug being located in a space between two concentric cylindrical ferrules.

According to the invention, the essential feature consisting of using an annular cold trap makes it possible to significantly increase the exchange surface, which can obviously be further increased through the use of blades, barbs or wires. This increase in the heat exchange surface makes it possible to cool with air or gas large capacity cold traps and thus economize on the liquid circuits having the aforementioned disadvantages.

The invention can also apply to cold traps cooled by an organic liquid, in which case it is possible to make much more compact traps for an equivalent treatment in sodium quantity to those of conventional traps.

According to a secondary feature of the present invention, the other part of the trap is constituted by a single cylindrical chamber which is no longer annular and the cooling fluid of the inner ferrule of the lower part is passed in "circular" paths through a central distribution shaft.

BRIEF DESCRIPTION OF THE DRAWINGS

The invention is described in greater detail hereinafter relative to a non-limitative embodiment of an annular cold trap with reference to FIGS. 2 and 3, wherein show.

DETAILED DESCRIPTION OF THE INVENTION

Figure 1:
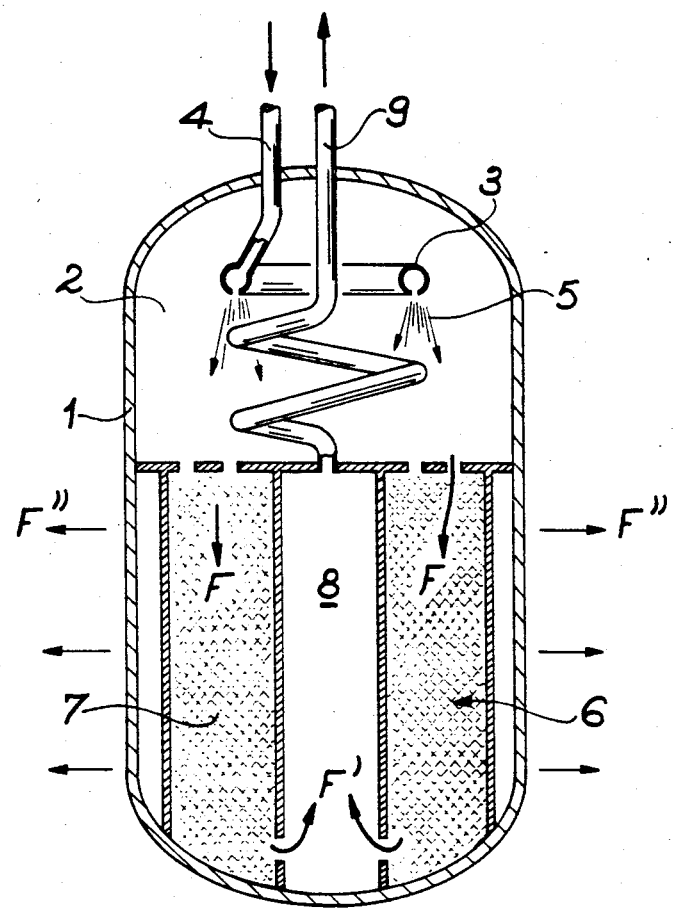
FIG. 1 a diagrammatic section along the axis of a prior art cold trap.
Figure 2:
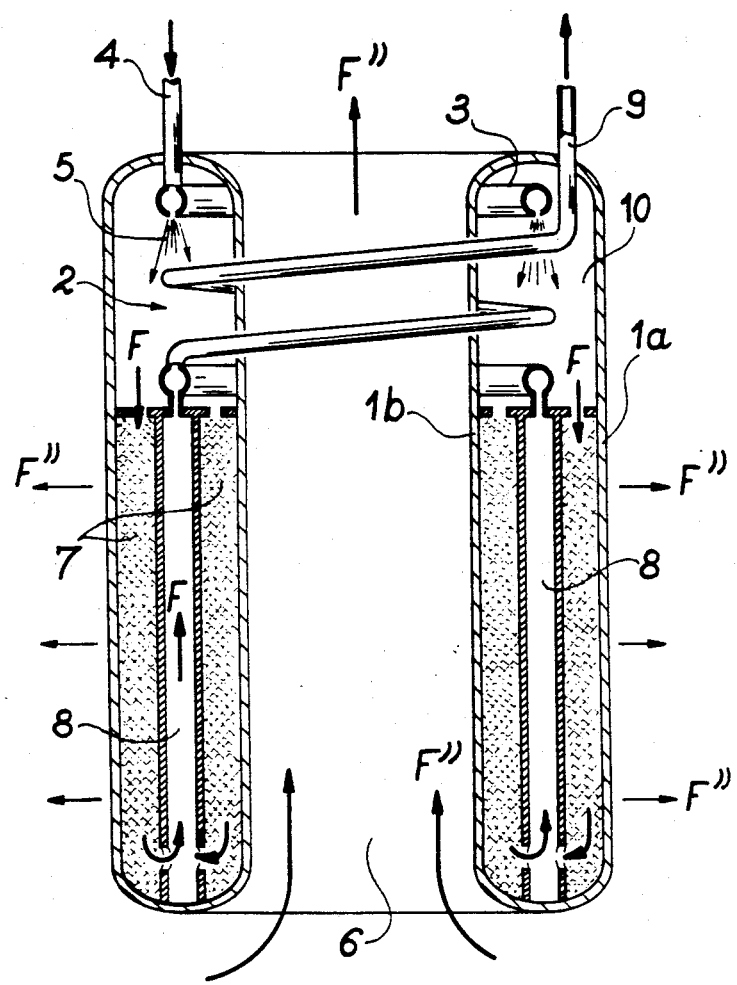
FIG. 2 a diagrammatic section along the axis of an annular cold trap according to the invention.

FIG. 2 shows the outer volume 1a of the cold trap, but on this occasion it is duplicated by a second inner ferrule 1b between which is defined an annular space 10 containing in the lower part the stainless steel wool filter plug 7. In said space 10, the steel plug 7 has an annular shape with an inner shaft 8 for raising the sodium which has passed through plug 7. As in FIG. 1, the sodium circulation direction is indicated by arrows F.

In the embodiment of FIG. 2, the enclosure containing the cold trap is annular from bottom to top, i.e. both in the upper part 2 and in the lower part 6. As in FIG. 1, there is a sodium inlet 4 and a sodium outlet 9, and economizer 3, which is provided with openings 5 for distributing the sodium in shower-like manner. The cooled fluid which licks along the inner wall 1b of the annular trap then flows along the vertical axis of the apparatus into the inner space defined by ferrule 1b.

The annular cold trap of FIG. 2 functions in the same way as the cylindrical trap according to FIG. 1, but the increase in the exchange surface between the lower part of ferrules 1a, 1b and the cooling flow (gas or liquid) diagrammatically indicated by arrows F" takes place along a surface which is roughly double the surface of the cold trap of FIG. 1 for comparable external dimensions. This leads to considerable economies, whilst increasing the resulting heat exchange.

Figure 3:
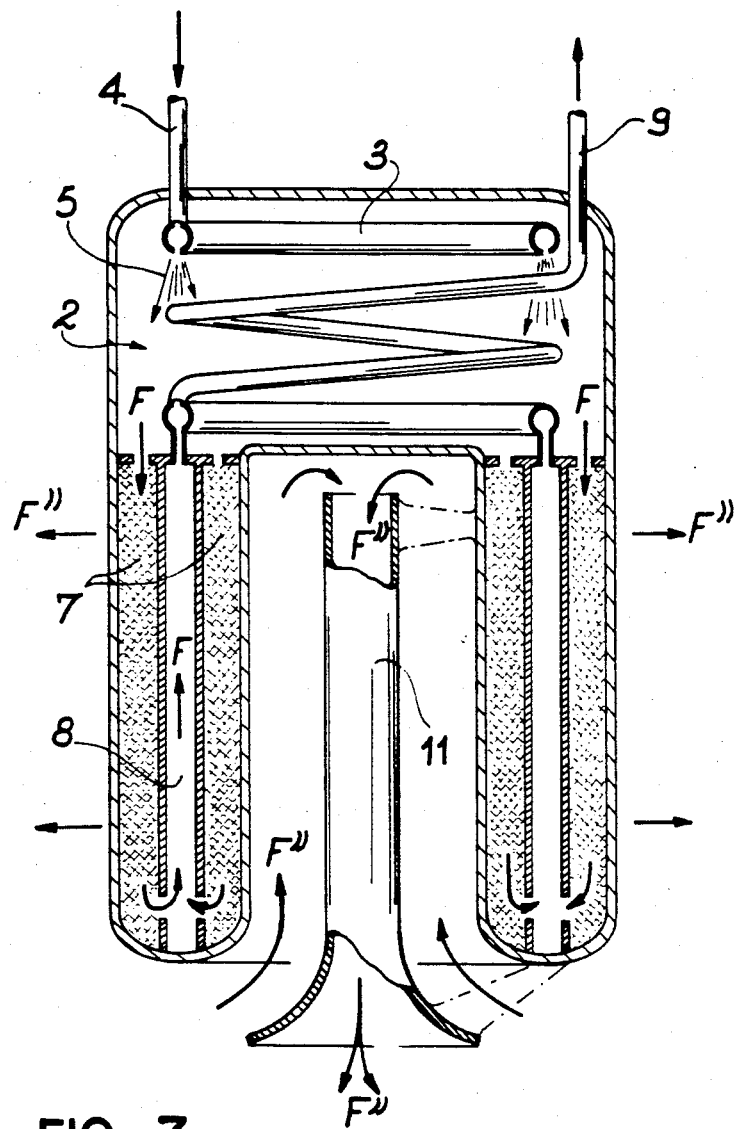
FIG. 3 a diagrammatic section along the axis of an annular cold trap according to a variant of the invention, in which the upper part of the trap is constituted by a single cylindrical chamber.

In a constructional variant of the cold trap shown in FIG. 3, the upper part 2 is cylindrical instead of being annular and in this case the cooling fluid of the inner cylinder 1b is passed along "circular" paths through the central shaft 11 centered on the common axis of the two ferrules 1a, 1b.

What is claimed is:

1. A cold trap for purifying liquid sodium, comprising:
    a hollow cylindrical enclosure having an outer side wall, a cooling fluid which contacts said outer side wall; said enclosure being provided with an inner side wall spaced radially inwardly from said outer side wall and which is also contacted by the cooling fluid, enclosure end walls which are spaced apart axially of said enclosure and which connect said inner and said outer side walls together; an annular chamber extending between said end walls and between said side walls about the periphery of said enclosure with said inner side wall defining a central passage through which the cooling fluid flows; a filter within the lower part of said annular chamber for removing impurities from the liquid sodium, said filter being in heat conducting contact with both said outer and said inner side walls to transfer heat to the cooling fluid via both of said side walls;
    and a means for introducing hot liquid sodium near a top part of said enclosure and means to pass said hot liquid sodium longitudinally through said filter, said hot liquid sodium being filtered and cooled with heat being removed from said hot liquid sodium via a path which includes said filter, and the cooling fluid in contact with said side walls;
    conduit means disposed within said filter for conducting purified and cooled sodium from a bottom part of said filter to the top of said filter; and
    a heat exchange means connected to said conduit means for conducting cooled purified sodium from said filter to a top part of said enclosure and for lowering the temperature of said introduced hot sodium.

2. A cold trap according to claim 1, wherein said heat exchanger is located in a top part of said annular chamber; said means for introducing hot liquid sodium is disposed above said heat exchanger, and said central passage extends through said enclosure from one end to the other.

3. A cold trap according to claim 1, wherein said annular chamber and said central passage terminate to form a space in the upper part of said enclosure and said heat exchanger and said means for introducing hot liquid sodium are disposed within said space and a conduit is centrally disposed within said central passage to conduct cooling fluid introduced upwardly in contact with the inner side walls of said annular chamber and downwardly through said centrally disposed conduit.

* * * * *